(12) United States Patent
Westerink et al.

(10) Patent No.: US 8,306,981 B2
(45) Date of Patent: Nov. 6, 2012

(54) INITIALISING OF A SYSTEM FOR AUTOMATICALLY SELECTING CONTENT BASED ON A USER'S PHYSIOLOGICAL RESPONSE

(75) Inventors: Joanne Henriette Desiree Monique Westerink, Eindhoven (NL); Marjolein Dimmie Van Der Zwaag, Eindhoven (NL); Froukje Anke Van Egmond, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 13/120,931

(22) PCT Filed: Sep. 23, 2009

(86) PCT No.: PCT/IB2009/054169
§ 371 (c)(1),
(2), (4) Date: Mar. 25, 2011

(87) PCT Pub. No.: WO2010/035227
PCT Pub. Date: Apr. 1, 2010

(65) Prior Publication Data
US 2011/0179054 A1  Jul. 21, 2011

(30) Foreign Application Priority Data

Sep. 29, 2008  (EP) .................................... 08165329

(51) Int. Cl.
*G06F 7/00* (2006.01)
*G06F 17/30* (2006.01)
(52) U.S. Cl. ........................................ 707/736; 707/758
(58) Field of Classification Search ........................ None
See application file for complete search history.

(56) References Cited

U.S. PATENT DOCUMENTS 6,623,427 B2   9/2003 Mandigo
(Continued)

FOREIGN PATENT DOCUMENTS

| EP | 1845517 A2 | 10/2007 |
|---|---|---|
| EP | 1895505 A2 | 3/2008 |
| WO | 03019560 A2 | 3/2003 |

OTHER PUBLICATIONS

Oliver et al: "PAPA: Physiology and Purpose-Aware Automatic Playlist Generation"; Proceedings of Fismir 2006, 7th International Conference on Music Information Retrieval, Victoria, Canada, October 2006, 4 Page Document.

(Continued)

*Primary Examiner* — Jay Morrison

(57) ABSTRACT

A method of enabling the selection of an item of content data based on an expected physiological response of a user, each item of content data being associated with at least one recording of a perceptible content element, includes storing a first set (18) of data representative of a relation between at least one variable for characterizing an aspect of a perceptible content element and a physiological response of at least one first user when the perceptible content element is rendered. The first set (18) of data representative of the relation is adapted on the basis of a measured physiological response of the at least one first user to a rendition of a perceptible content element and values of the at least one variable for characterizing an aspect of the perceptible content element. An expected physiological response is associated with an item of content data using a further set (20,21) of data representative of a relation between at least one variable for characterizing an aspect of a perceptible content element and a physiological response of a user, which further set (20,21) is based on the physiological response of at least one other user than the first user.

11 Claims, 3 Drawing Sheets

U.S. PATENT DOCUMENTS

2005/0038819 A1 2/2005 Hicken et al.
2005/0098023 A1 5/2005 Toivonen et al.
2007/0061364 A1 3/2007 Klein, Jr.
2007/0156676 A1 7/2007 Rosenberg
2007/0174274 A1 7/2007 Kim et al.

OTHER PUBLICATIONS

Klapuri, A.: "Musical Meter Estimation and Music Transcription"; Tampere University of Technology, Tampere, Finland, 6 Page Document, Downloaded From the Internet AT: http://www.cs.tut.fi/sgm/arg/klap/cambridge.pdf on Sep. 1, 2008.

INITIALISING OF A SYSTEM FOR AUTOMATICALLY SELECTING CONTENT BASED ON A USER'S PHYSIOLOGICAL RESPONSE

FIELD OF THE INVENTION

The invention relates to a method of enabling the selection of an item of content data based on a user's physiological response, and a system for selecting an item of content data based on a user's physiological response. The invention also relates to a computer programme.

BACKGROUND OF THE INVENTION

Oliver, N. and Kreger-Stickles, L., "PAPA: Physiology and Purpose-Aware Automatic Playlist Generation", *Proc. of ISMIR 2006, 7th Int. Conf on Music Information Retrieval*, Victoria, Canada, 8-12 Oct. 2006, discloses an application that selects music to assist users in achieving specific exercising goals, and incorporates the user's physiological response to the music to determine the next song to play. Typically, the user is listening to music from his personal digital library (DML) by means of a portable digital music player. The system has access to the user's profile together with historic data in the form of logs of previous interactions with the system. The user also wears a set of physiological and environmental sensors. The user's DML is augmented with relevant metadata such as the song's tempo, average energy, duration, genre, etc. The system utilizes the user's bio-feedback and explicit feedback to learn a model of the set of features in the music—e.g. tempo, average energy, etc.—and the user's response to it.

A problem of the known system is that it can only work after it has accumulated data in its database, i.e. updated its model, preferably across the range of possible values of tempo, average energy, etc.

SUMMARY OF THE INVENTION

It is desirable to provide a method, system and computer programme of the type mentioned above that enable the system to function well prior to completion of any learning period.

This is achieved by the method according to the invention which includes:

storing a first set of data representative of a relation between at least one variable for characterizing an aspect of a perceptible content element and a physiological response of at least one first user when the perceptible content element is rendered;

adapting the first set of data representative of the relation on the basis of a measured physiological response of the at least one first user to a rendition of a perceptible content element and values of the at least one variable for characterizing an aspect of the perceptible content element; and associating an expected physiological response with an item of content data using at least one further set of data representative of a relation between at least one variable for characterizing an aspect of a perceptible content element and a physiological response of a user, which further set is based on the physiological response of at least one other user than the first user.

Because the system has available data representative of a relation between at least one variable for characterizing an aspect of a perceptible content element and a physiological response of a user based on the physiological response of at least one other user than the first user, the system can be used to associate physiological responses with content data items even where no or very few content elements have been rendered for the first user or users. The same is true if the user has enjoyed only content data items of a certain style, and the system is confronted with a new content data item of a very different style. Data representative of a relation between at least one variable for characterizing an aspect of a perceptible content element and a physiological response of at least one first user, when the perceptible content element is rendered, is well-suited to making accurate and appropriate recommendations of content data items. In contrast to mood or genre classifications, physiological responses are well-defined. Moreover, classification of content data items on a finer scale can be made, because physiological responses can be parameterized. Moreover, it is easier to provide a relation between content element characteristics and physiological response than between content element characteristics and moods or genres. It has been found empirically that there is no well-defined relation between genre classifications of music and music characteristics, whereas such a relation has been found to exist between physiological responses of users and music characteristics.

In an embodiment, the further set of data is obtained by making a selection from a plurality of second sets of data, each second set of data representative of a relation between at least one variable for characterizing an aspect of a perceptible content element and a physiological response of a user, and each second set being based on the physiological response of at least one other user than the first user.

The selection may be a pure selection of one of the second sets of data or a weighted average for which the weights are selected. This embodiment addresses the problem that a particular other user is likely to show a quite different physiological response to content elements such as audio or video tracks than the first user or users, and that an average of other users' responses will also only resemble the first user's response by chance.

In a variant of this embodiment, the selection is made in response to user input from a first user.

Thus, a user can influence the selection, and the selection thus becomes more personalized. The second sets of data may be characteristic for different prototype users, the selection being made according to how well the first user or first users conform to the different prototypes.

In an embodiment, the second sets of data are associated with respective personality types, and wherein the user input is obtained by causing at least one question for determining a type of personality to be presented on an output device.

It is known that it is possible to characterize a person using e.g. five dimensions (the Five Factor Model). Using only one or a few questions ensures that a system implementing the method can be deployed relatively quickly. The questions and logic required to evaluate the answers do not use up a large amount of resources of the system. This embodiment is based on the finding that a user's physiological reaction to music is likely to depend on his or her personality as well as on the music's inherent characteristics (tempo, beat, percussiveness and the like). Indeed, the user's personality has been found to modify the relation between music characteristics and physiological responses. For instance, the number of skin conductance peaks is found to rise with percussiveness for every person, but the rise is much steeper for extravert persons than for introvert persons.

In an embodiment of the method, a value of at least one of the variables for characterizing an aspect of a perceptible content element is obtainable by applying an analysis algorithm to a signal for rendering the perceptible content element.

An effect is to provide an objective, repeatable relation in each of the first and further sets of data, which makes them suitable for comparison with each other and substitution for each other. This approach is in contrast to the use of a relation between subjective assessments of content data item properties and physiological responses.

An embodiment of the method includes maintaining a database associating each of a plurality of selectable content data items with data representative of a physiological response.

An effect is to allow quick selection of a content data item based on a required physiological response. It is possible to search for a content data item to provide a target physiological response without having to classify content data items based on characteristics of the associated perceptible content elements, and without having to use a model to evaluate the search query.

In a variant of this embodiment, the database is updated using data representative of a physiological response of a first user when a content element associated with a content data item in the database is rendered in perceptible form to the first user.

An effect is to personalize the database to provide results of relevance to the first user or users more efficiently.

A further variant of the above-mentioned embodiment includes adding a new content data item to the database in association with data representative of a physiological response, the data being obtained by obtaining values of the at least one variable for characterizing an aspect of the perceptible content element associated with the new content data item and deriving a physiological response using at least one of the first and further set of data.

An effect is that the new content data item can be found in response to a search query using a target physiological response without first having to render it to determine such a response. This is of particular use when a system implementing the method has just been deployed.

A further variant of this embodiment includes enabling a selection of a content data item based on an input corresponding to a target and a relation between a range of target values and parameters characterizing a physiological response.

An effect is that the method is suitable for providing an effective search facility to users, who can formulate search queries.

According to another aspect, the system for selecting an item of content data according to the invention:

is configured to store a first set of data representative of a relation between at least one variable for characterizing an aspect of a perceptible content element and a physiological response of at least one first user when the perceptible content element is rendered, is configured to adapt the first set of data representative of the relation on the basis of a measured physiological response of the at least one first user to a rendition of a perceptible content element and values of the at least one variable for characterizing an aspect of the perceptible content element, and is provided with at least one further set of data representative of a relation between at least one variable for characterizing an aspect of a perceptible content element and a physiological response of a user based on the physiological response of at least one other user than the first user.

The system can classify content data items of the above-mentioned type relatively well, even where the first set of data is not (yet) fully adapted to the first user(s) across the range of possible combinations of values of the at least one variable for characterizing an aspect of the perceptible content element.

In an embodiment, the system is configured to execute a method according to the invention.

According to another aspect of the invention, there is provided a computer program including a set of instructions capable, when incorporated in a machine-readable medium, of causing a system having information processing capabilities to perform a method according to the invention.

BRIEF DESCRIPTION OF THE DRAWINGS

The invention will be explained in further detail with reference to the accompanying drawings, in which.

DETAILED DESCRIPTION

Figure 1:
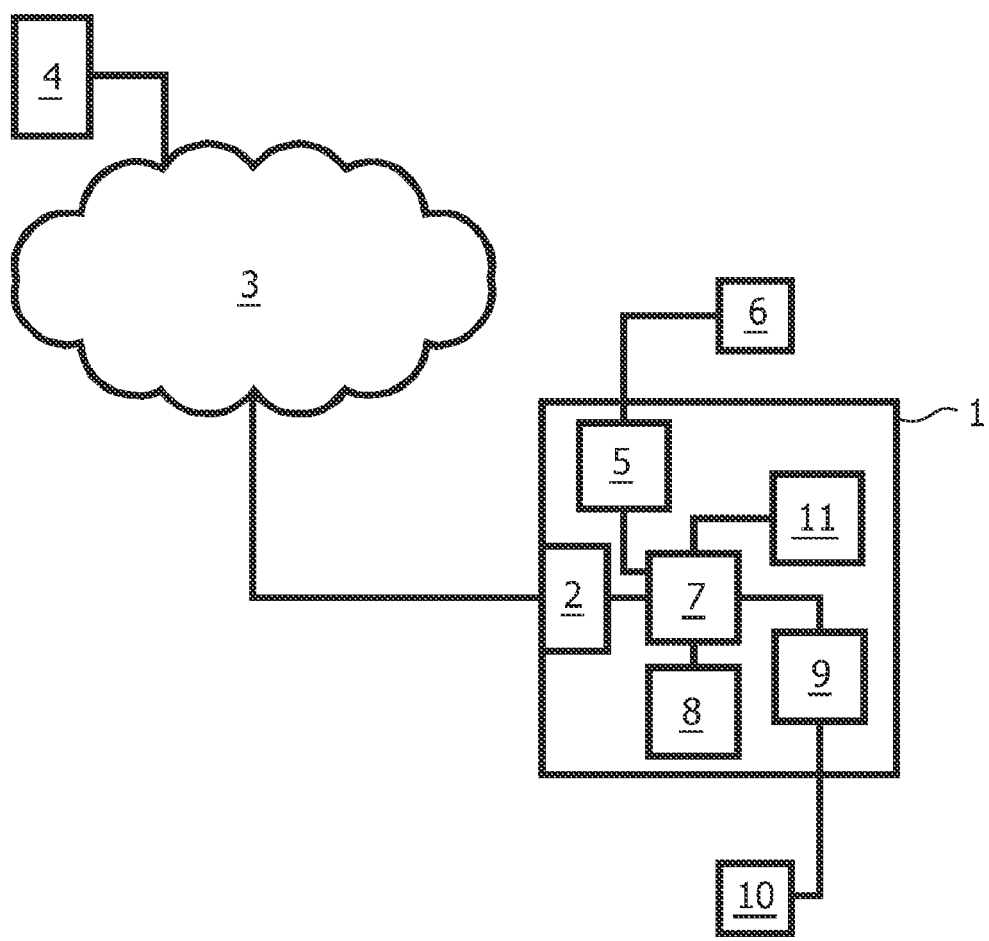
FIG. 1 schematically shows elements of a system for downloading and playing back audio tracks.

In the following, a description will be given of a method implemented in a portable media player 1 having an interface 2 for connection to a network 3. The network is a Wide Area Network such as the Internet or a mobile phone operator's network, for enabling audio and/or video files to be downloaded from a server 4. The method allows a user of the portable media player to have it select a file comprising a recording of an audio track, video excerpt and/or audiovisual signal for playback or for suggestion in the form of a recommendation to the user. The method described herein could also, however, be implemented in its different varieties in the server 4, e.g. to provide a file for download from a collection available at the server 4 or an associated server, or to provide a recommendation to a user of a device in communication with the server 4.

In the case of a recommendation, the portable media player 1 selects an identification (or a number of identifications which are optionally ranked) of a content data item associated with a perceptible content element (audio track, video excerpt, etc.). In the alternative, the method results in the provision of a file comprising data representative of a recording of a perceptible content element, e.g. an audio or audiovisual content data file.

The portable media player 1 is suitable for carrying on the user's person, e.g. in his or her pocket or bag, strapped to a limb, etc. It has an interface to at least one sensor 6 for determining the value of at least one physiological parameter of the user. The sensor 6 may be a contactless sensor, but is generally at least intermittently in contact with the user. As an example, the sensor 6 may measure skin conductance, heartbeat, heartbeat variability, body temperature, blood pressure, etc. The interface 5 may be wired or wireless, e.g. providing a personal area network based on e.g. the Zigbee or Bluetooth protocols. In an alternative embodiment, the portable media player 1 additionally or alternatively comprises an internal sensor for determining the value of at least one physiological parameter of the user.

Figure 2:
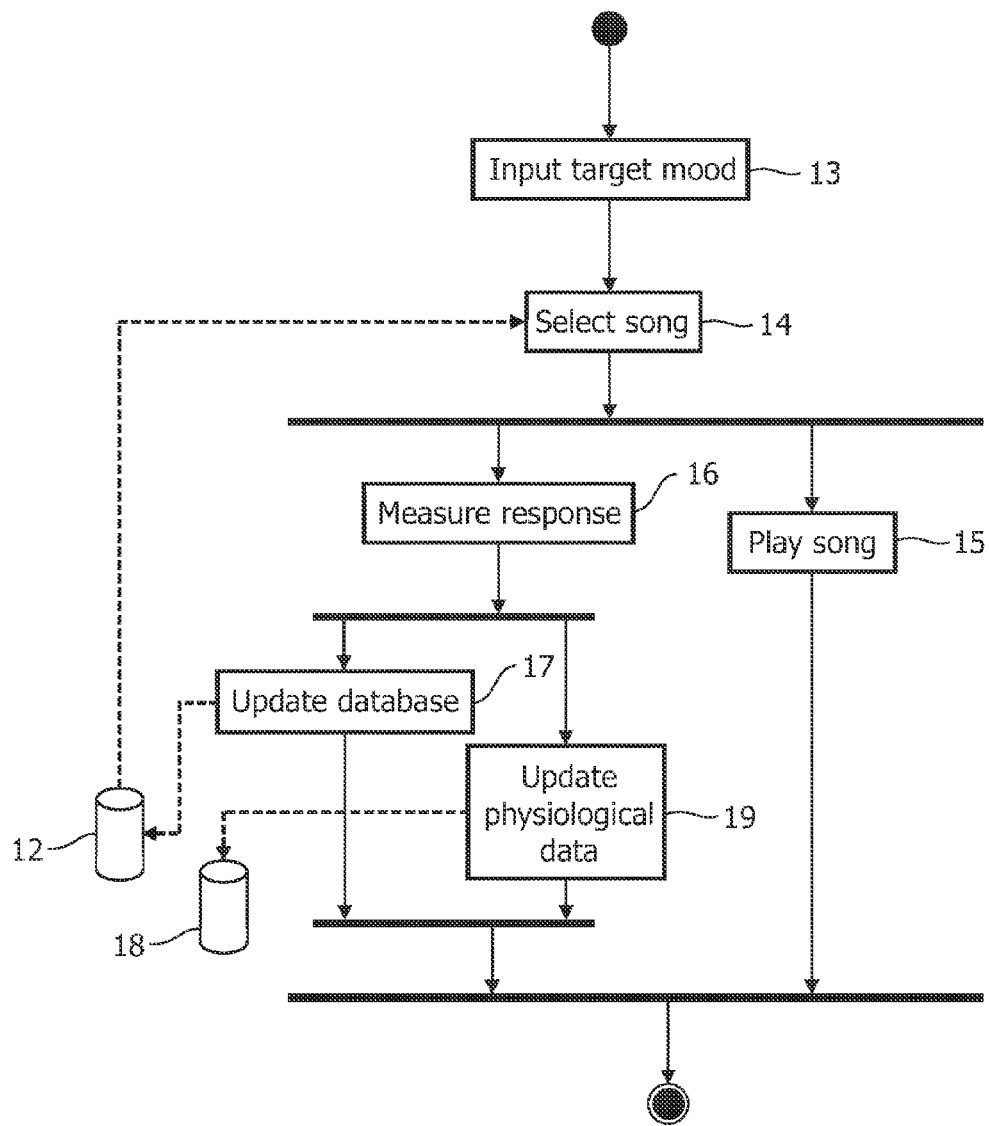
FIG. 2 is a flow chart of a method of facilitating the selection of an audio track by a user or automatically by a music player.
Figure 3:
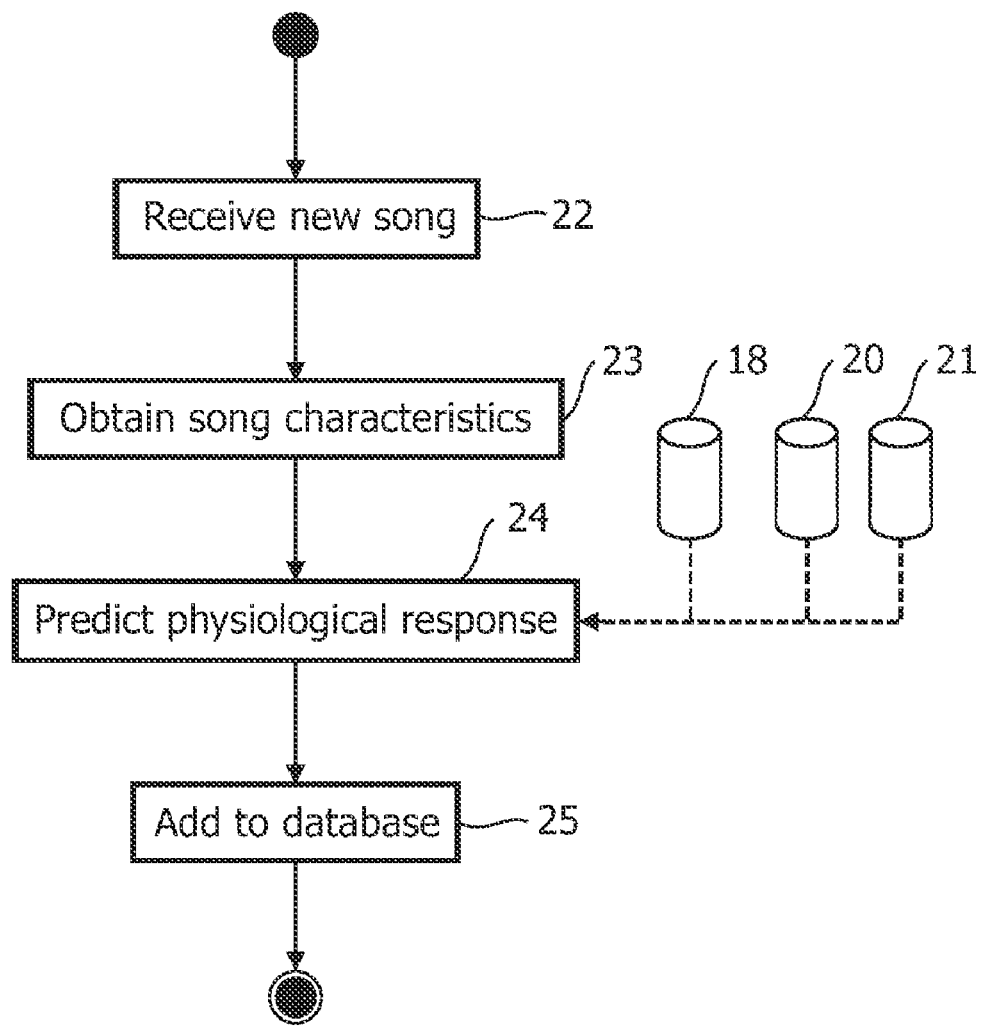
FIG. 3 is a flow chart of a method of classifying a new audio track prior to making it available for selection.

The portable media player 1 is provided with a data processor 7 and memory 8 for executing the methods illustrated in FIGS. 2 and 3. The memory 8 comprises at least one of a solid-state memory device, (magneto-) optical disk drive, hard disk unit, tape drive, holographic memory etc. for maintaining the databases to be described herein. It additionally comprises working memory and read-only memory for storing instructions enabling the processor 7 to carry out the methods.

A media decoder 9 and output stage is provided for rendering perceptible content elements, e.g. audio tracks and/or videos, on an output device 10. The portable media player 1 additionally comprises an internal display device 11 for providing a graphical user interface.

It is well known that music can change a person's mood, e.g. helping to make a person feel better if they are down. It is also known that what works for one person might not help for someone else. The portable media player 1 comprises a library of audio tracks in association with data indicating the effect the audio track has on a person's mood. This data is then used to generate personalized play lists of these audio tracks in order to guide the user to a desired mood.

A characteristic of the portable media player 1 is that it does not need to have played back all the audio tracks in its library and recorded the physiological response in order to provide a play list with meaningful results. As a consequence, a new audio track added to the collection can be selected for a playlist before it has ever been played to the user by the portable media player 1, if it contributes to the desired influence on the user's mood. Moreover this functionality is available in at least a minimal form even when the library contains only very few audio tracks, or very few audio tracks that have been played back, such as would be the case when the portable media player 1 has just been acquired by the user.

Referring to FIGS. 2 and 3, the portable media player 1 maintains a database 12 associating each of the audio tracks in the library with data representative of a physiological response. In one variant of the method, the portable media player 1 provides a separate database 12 for each of a plurality of known users (also referred to herein as "first users"). In another embodiment, it does not distinguish between users, assuming them to be the same.

If the portable media player 1 is able to distinguish between users, then a user will first identify himself or herself. Otherwise, the method of selecting an audio track commences with a first step 13 in which the user provides input indicative of a target mood. This input may be in the form of a desired mood change, e.g. "more upbeat". In another embodiment, a different input corresponding to a target is given, e.g. a numerical value on a scale of one to ten that is representative of some sort of psychological or physiological state of the user.

The portable media player 1 translates the input corresponding to a target into a value or values of one or more parameters characterizing a physiological response and uses these values to search the first database 12 to select one or more audio tracks (step 14), which it may rank according to how well they match the search criterion.

In the illustrated example, for simplicity, it is assumed that one audio track is selected, which is then rendered in perceptible form (step 15) using the output device 10 and decoder 9. During at least part of the rendition of the audio track, the physiological response of the user is determined (step 16). Data representative of the physiological response of the user when the audio track is rendered are used to update (step 17) the database 12.

The portable media player 1 is configured also to store a first set 18 of data representative of a relation between at least one variable for characterizing an aspect of a perceptible content element such as an audio track and a physiological response of the user or users of the portable media player 1. In one embodiment, a first set 18 is maintained for each of a plurality of identified users. In another embodiment, it is assumed that the user of the portable media player 1 is always the same, so that the set of data is adapted to the users of the portable media player 1 as a collective. In effect, this first set 18 of data embodies information on how audio tracks with certain characteristics have had an effect on this particular user's or these users' physiological mood-related signals.

The variable or variables used in the methods discussed herein for characterizing an aspect of a perceptible content element such as an audio track or video excerpt are generally a function of inherent characteristics of the audio or video signal. That is to say, that for any given content element, the values of the parameters are obtainable by applying a predetermined analysis algorithm to the audio or video signal itself. For audio tracks, the meter can be analyzed or tempo and beat analysis can be carried out. An example of a method involving the former type of analysis is given in Klapuri, A., "Musical meter estimation and music transcription", downloaded from the Internet at http://www.cs.tut.fi/sgn/arg/klap/cambridge.pdf on 1 Sep. 2008. A further possibility is to model an audio track or section of an audio track using Mel Frequency Cepstral Coefficients. Generally, this type of signal analysis, involving a characterization of the signal development rather than a semantic analysis of the information carried by the signal can be done relatively quickly and efficiently. Alternatively or additionally, speech recognition may be employed in combination with an analysis of the lyrics of audio tracks corresponding to sung music. For video excerpts, the brightness, abruptness of scene changes, color composition etc. may be used as characteristics. For audiovisual content data files, e.g. films, only one of the several perceptible content elements (audio, video) can be characterized. For example, only the sound track of a movie can be characterized, since this is computationally easier and the sound track is characteristic of the whole of the audiovisual content.

The first set 18 of data is updated (step 19) when an audio track is rendered in perceptible form by obtaining values of the parameters characterizing the audio track being played back and by obtaining data representative of the physiological response measured in the preceding step 16.

Referring to FIG. 3, in the illustrated embodiment, the portable media player 1 is additionally provided with first and second further sets 20,21 of data, each of the further sets 20,21 of data being representative of a relation between the at least one variable for characterizing an aspect of a perceptible content element such as an audio track and a physiological response of a user. These further sets 20 21 are based on the physiological response of at least one other user than the current user of the portable media player 1. In the illustrated embodiment, the first further set 20 of data is generally based on the physiological reactions of one or more other people. These could be other ones of the users of the portable media player 1 where the portable media player 1 is configured to distinguish between users. Alternatively, the first further set 20 could be based on an average of the physiological responses of a representative sample of the population. The manufacturer of the portable media player 1 may provide different respective first further sets 20 for different geographical markets to improve the chances of matching the physiological response of the current user.

In the illustrated embodiment, the second further set 21 of data representative of a relation between the at least one variable for characterizing an aspect of a perceptible content element such as an audio track and a physiological response of a user is selected from among a number of pre-installed second sets of data. Each second set in turn is representative of a relation between the at least one variable for characterizing an aspect of a perceptible content element such as an audio track and a physiological response of a user or group of users with a particular respective personality. For example, there may be thirty-two second sets of data pre-installed in the portable media player 1, each representative of a particular combination of five personality dimensions according to the known Five Factor Model for characterizing personalities. On first use of the portable media player 1 by a new user, this user is asked a limited number of questions designed to determine where this user is on each of the five dimensions. The questions may be presented on the display device 11, with the answers being input using a stylus for a touch screen or some other kind of input device (not shown).

Referring to FIG. 3, whenever the portable media player 1 receives (step 22) a new audio track, e.g. one downloaded from the server 4 over the network 3, it obtains (step 23) values of the variables for characterizing aspects of the audio track. These can be provided by the server 4, especially in case of complicated pre-determined analyses, or the portable media player 1 can obtain them itself by carrying out the pre-determined analysis or analyses. Preferably, they are stored in association with the audio track in the database 12 to make the step 19 of updating the first set of data easier to carry out.

The portable media player 1 then predicts (step 24) a physiological response using at least one of the first set 18 of data, the first further set 20 of data and the second further set 21 of data and on the basis of the values of the at least one variable for characterizing an aspect of the new audio track received.

In the illustrated embodiment, the first set 18 of data is initially a copy of one of the first and second further sets 20,21, or a combination of the two, e.g. an average or weighted average. Alternatively, the portable media player 1 may be configured not to use the first set 18 of data for deriving expected physiological responses for new audio tracks until the step 19 (FIG. 2) of updating the first set 18 of data has been carried out a pre-determined number of times and/or for audio tracks covering a pre-determined range of values of the parameters for characterizing aspects of audio tracks. In yet another alternative, the portable media player 1 uses at least one of the first and second further sets 20,21 if the values of the variables characterizing the perceptible content element (audio signal) associated with the new content data item (new audio file) within ranges for which the first set 18 predicts the physiological response with insufficient certainty. In each of these alternatives, the portable media player 1 associates an expected physiological response with an item of content data using at least one of the further sets 20,21 of data representative of a relation between at least one variable characterizing an aspect of a perceptible content element and a physiological response of a user, the further set being based on the physiological response of at least one other user than the current user of the portable media player 1.

Next, the new audio track is added (step 25) to the database 12 in association with the expected physiological response. Thus, the new content data item, despite not having been played back yet, can still be selected in the corresponding step 14 of the method of FIG. 2. Of course, the expected physiological response would then be replaced by the actual physiological response once the audio track has been rendered and the actual physiological response of the user determined.

It should be noted that the above-mentioned embodiments illustrate, rather than limit, the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The mere fact that certain measures are recited in mutually different dependent claims does not indicate that a combination of these measures cannot be used to advantage.

In an alternative embodiment to the one discussed herein, a non-portable computer system with an interface to a sensor like the sensor 6 discussed above is used instead of or in addition to the portable media player 1. Moreover, a measured physiological response may be the result of a measurement by the sensor 6 and an additional processing step by the processor 7 e.g. to assess heartbeat variability over short intervals of time.

The invention claimed is:

1. Method of enabling the selection of an item of content data based on an expected physiological response of a user, each item of content data being associated with at least one recording of a perceptible content element, comprising:
   storing a first set of data representative of a relation between (i) at least one variable for characterizing an aspect of a perceptible content element and (ii) a physiological response of at least one first user when the perceptible content element is rendered;
   adapting the first set of data representative of the relation on the basis of (i) a measured physiological response of the at least one first user to a rendition of a perceptible content element and (ii) values of the at least one variable for characterizing an aspect of the perceptible content element; and
   associating an expected physiological response with an item of content data using at least one further set of data representative of a relation between (i) at least one variable for characterizing an aspect of a perceptible content element and (ii) a physiological response of a user other than the first user, wherein said further set of data is based on the physiological response of at least one user other than the first user.

2. Method according to claim 1, wherein the further set of data is obtained by making a selection from a plurality of second sets of data, each second set of data representative of a relation between at least one variable for characterizing an aspect of a perceptible content element and a physiological response of a user other than the first user, and each second set being based on the physiological response of at least one user other than the first user.

3. Method according to claim 2, wherein the selection is made in response to user input from a first user.

4. Method according to claim 3, wherein the second sets of data are associated with respective personality types, and wherein the user input is obtained by causing at least one question for determining a type of personality to be presented on an output device.

5. Method according to claim 1, wherein a value of at least one of the variables for characterizing an aspect of a perceptible content element is obtainable by applying an analysis algorithm to a signal for rendering the perceptible content element.

6. Method according to claim 1, further comprising maintaining a database associating (i) each of a plurality of selectable content data items with (ii) data representative of a physiological response.

7. Method according to claim 6, wherein the database is updated using data representative of a physiological response of a first user when a content element associated with a content data item in the database is rendered in perceptible form to the first user.

8. Method according to claim 6, further comprising:
adding a new content data item to the database in association with data representative of a physiological response, the data being obtained (i) by obtaining values of the at least one variable for characterizing an aspect of the perceptible content element associated with the new content data item and (ii) deriving a physiological response using at least one of the first and further set of data.

9. Method according to claim 6, further comprising enabling a selection of a content data item based on (i) an input corresponding to a target and (ii) a relation between a range of target values and parameters characterizing a physiological response.

10. System for selecting an item of content data based on an expected physiological response of a user, each item of content data being associated with at least one recording of a perceptible content element, comprising:
a memory configured to store a first set of data representative of a relation between (i) at least one variable for characterizing an aspect of a perceptible content element and (ii) a physiological response of at least one first user when the perceptible content element is rendered; and
a processor configured to adapt the first set of data representative of the relation on the basis of (i) a measured physiological response of the at least one first user to a rendition of a perceptible content element and (ii) values of the at least one variable for characterizing an aspect of the perceptible content element,
wherein the memory is provided with at least one further set of data representative of a relation between (i) at least one variable for characterizing an aspect of a perceptible content element and (ii) a physiological response of at least one user other than the first user.

11. A non-transitory computer-readable medium embodied with a computer program including a set of instructions executable by a processor for causing a system having information processing capabilities to perform a method according to claim 1.

* * * * *